United States Patent [19]

Dreier

[11] Patent Number: 5,293,104
[45] Date of Patent: Mar. 8, 1994

[54] DRIVE DEVICE FOR MOVABLE STRUCTURAL COMPONENT UNITS

[75] Inventor: Friedrich-Wilhelm Dreier, Bühl, Fed. Rep. of Germany

[73] Assignee: Robert Bosch GmbH, Stuttgart, Fed. Rep. of Germany

[21] Appl. No.: 777,549
[22] PCT Filed: Nov. 14, 1990
[86] PCT No.: PCT/DE90/00874
 § 371 Date: Jan. 24, 1992
 § 102(e) Date: Jan. 24, 1992
[87] PCT Pub. No.: WO91/09198
 PCT Pub. Date: Jun. 27, 1991

[30] Foreign Application Priority Data
 Dec. 16, 1989 [DE] Fed. Rep. of Germany ....... 3941651

[51] Int. Cl.$^5$ ............................................. H02P 1/00
[52] U.S. Cl. ........................................................ 318/280
[58] Field of Search ........................................ 318/280

[56] References Cited
U.S. PATENT DOCUMENTS

| | | | |
|---|---|---|---|
| 4,683,975 | 8/1987 | Booth et al. | 318/280 |
| 4,706,005 | 11/1987 | Iwako | 318/280 |
| 5,028,853 | 7/1991 | Brown, Jr. et al. | 318/280 |
| 5,109,184 | 4/1992 | Bahn | 318/280 |
| 5,184,048 | 2/1993 | Severson et al. | 318/280 |

*Primary Examiner*—William M. Shoop, Jr.
*Assistant Examiner*—Karen Masih
*Attorney, Agent, or Firm*—Michael J. Striker

[57] ABSTRACT

A drive device for movable structural component units, e.g. for a window lifter in motor vehicles, has a reversible electric motor and a control device for switching on the motor with predetermined rotating direction from its rotor shaft at a switch-on command. In order to manage with the lowest possible drive output and to keep the characteristic lines to be maintained by the motor within the narrowest possible range, both the motor and the structural component unit itself are constructed so as to be without friction and active self-locking is provided to keep the structural component unit in its movement end positions. For this purpose a sensor detects rotational movements of the rotor shaft from the movement end position and the control device is connected with an evaluating unit which evaluates the sensor signals and generates a switch-on command in a rotating direction opposite the rotational movement of the rotor shaft.

6 Claims, 3 Drawing Sheets

DRIVE DEVICE FOR MOVABLE STRUCTURAL COMPONENT UNITS

BACKGROUND OF THE INVENTION

The invention is based on a drive device for movable structural component units, particularly in vehicles, such as window lifters, sliding-roof actuators, mirror adjusters and the like.

More particularly, it relates to a drive device for movable structural component units, which has a reversible electric motor with a rotor shaft driveable in two rotating directions, and a control device for switching on the motor in a predetermined rotating direction of the rotor shaft at switch-on command.

An example of such a drive device for movable structural component units is an electric-motor window lifter in which the desired actuating process of the side window panes of the vehicle can be triggered by actuating one of two selection switches for "window closing" and "window opening". The triggered process of "window closing" or "window opening" runs automatically as long as the respective selection switch remains actuated and is interrupted when the end position is reached by opening an end switch. The end switches have already been replaced in modern systems by electronics with Hall sensors which switch off the drive motor when the end position is reached or when there is an obstacle in the window movement path (jamming protection).

To prevent the window pane from opening automatically, e.g. due to inherent weight or shaking, it is necessary for the drive device or the structural component unit to be self-locking, which is brought about in practice by great friction in the drive motor or in the window lifter system. However, this has substantial disadvantages. On the one hand, the desired friction can be reproduced in the manufacturing process only within a very great range of dispersion, so that the drive output of the drive motor must be designed to be substantially greater than would be necessary in the isolated case in order to protect functioning. On the other hand, higher drive outputs require a correspondingly more extensive layout of lines, fuse protection, battery capacity, etc.

SUMMARY OF THE INVENTION

Accordingly, it is an object of the present invention to provide a drive device for movable structural component units, particularly in vehicles such as window lifters, sliding-roof actuators, mirror adjusters and the like, which avoids the disadvantages of the prior art.

In keeping with these object and with others which will become apparent hereinafter, one feature of the present invention resides, briefly stated, in a drive device of the aforementioned type, which has a sensor for detecting rotational of the rotor shaft assigned to the rotor shaft of the motor and effective at least in the switched-off state of the motor, and a control device containing an evaluating unit for evaluating the sensor signals and for generating a witch-on command in a rotating direction opposite the rotating direction of the rotor shaft.

When the drive device is designed in accordance with the present invention, it has the advantage that the drive device obtains a so-called active self-locking, i.e. monitors the movement end state of the driven structural component unit and switches on automatically when this movement end state is changed by external influences in order to reproduce the movement end state through corresponding drive force. This means that both the drive motor and the structural component unit to be moved can be constructed so as to have as little friction as possible. This likewise leads to a substantial savings in drive energy and enables the use of small drive motors with smaller connection outputs on the other hand. Low-friction systems can also be produced with a substantially smaller fabrication spread than systems subject to a great amount of friction, so that the characteristic lines to be maintained by the drive motor for the movement flow of the structural component unit to be driven can be substantially limited.

In general the drive device according to the invention can monitor both movement end positions of the driven structural component unit and, depending on the movement direction of the structural component unit from the monitored end position, can start the drive motor in one drive direction or the other as soon as the structural component unit has been moved out of the end position by external influences by more than tolerance value. In many cases of application, e.g. window lifters in vehicles, it is only necessary to monitor one movement end position, e.g. the window closing position. In this case it is not necessary to know the movement direction of the structural component unit and the control electronics can be simplified.

At present, known drive devices for the side windows in vehicles are frequently outfitted with so-called Hall integrated circuits, hereinafter Hall IC, which detect the revolutions of the rotor shaft of the drive motor. Corresponding control electronics then make it possible to move directly to predetermined window positions, to switch off the drive motor in the end positions of the window and to protect against jamming, i.e. to switch off or reverse the drive motor in case of an obstacle in the window movement path. The drive device according to the invention has the advantage that these Hall ICs can be used as sensors for determining the rotational movement of the rotor shaft, so that the additional cost on electronics for the function of the active self-locking according to the invention is quite low.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
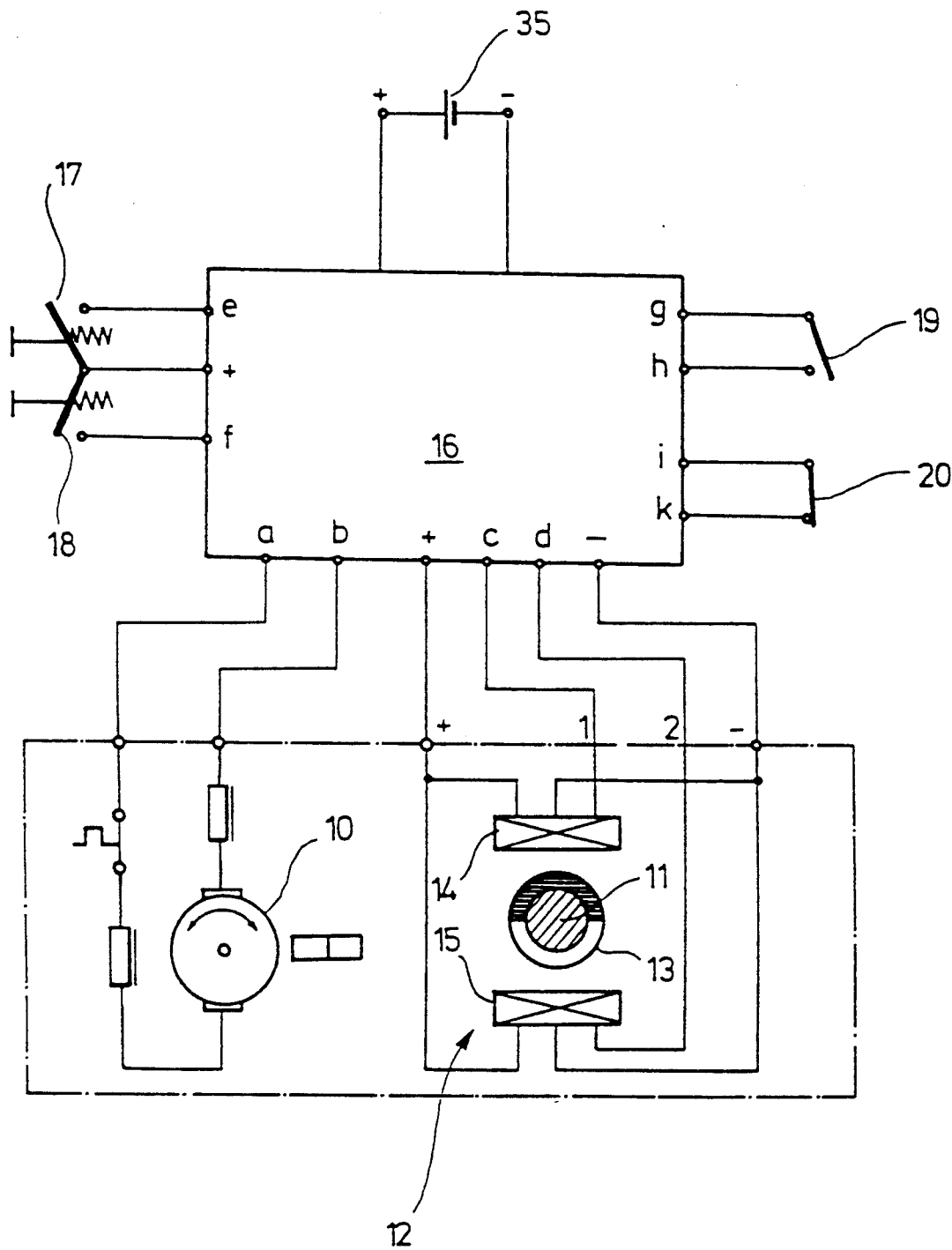
FIG. 1 shows a block wiring diagram of a drive device for a window lifter in motor vehicles.

The drive device for a window lifter in a motor vehicle shown in the block wiring diagram in FIG. 1 has an electric d.c. motor 10 which is excited by a permanent magnet and whose rotor shaft 11 can be driven in two rotational directions. The rotational movement of the rotor shaft 11 indicated at right in FIG. 1 is detected by a sensor 12. The sensor 12 is a Hall IC, known per se, which detects the number of revolutions of the rotor shaft in conventional window lifting devices, which information is then used for different control measures. It has a permanent magnet 13 which is connected with the rotor shaft 11 so as to be fixed with respect to rotation relative to it and two Hall elements 14, 15 which are arranged so as to be stationary at the rotor shaft 11 and are offset by 90° relative to one another. Two output signals composed of a sequence of square pulses can be taken off at the two output channels 1 and 2 of the Hall IC 12. One pulse period characterizes a revolution of the rotor shaft 11. The pulse frequency is dependent on the rate of rotation of the rotor shaft 11. The two pulse sequences are electrically shifted in phase by 90° relative to one another, so that the rotating direction of the rotor shaft 11 can be known from the direction of the phase shift.

The drive device for the window lifter further has a control device 16 connected to a d.c. voltage source 35. The motor 10 is connected to its outputs a and b and an output channel 1 or 2 of the Hall IC 12 is connected to its inputs c and d. One switching contact of a selection switch 17 and 18, respectively, which is constructed as a key switch, is connected with the inputs e and f, respectively, of the control device 16. Its other switching contact is connected to an output "+" of the control device 16 carrying positive potential. The selection switch 17 is actuated for closing the window and the selection switch 18 is actuated to open the window. An end switch 19 and 20 is connected with the inputs g, h and i, k, respectively, of the control device 16. The two end switches 19, 20 are normally closed and are opened by the window lifter in the end positions of the window pane. The end switch 19 is opened in the "window closed" position and the end switch 20 is opened in the "window open" position.

Figure 2:
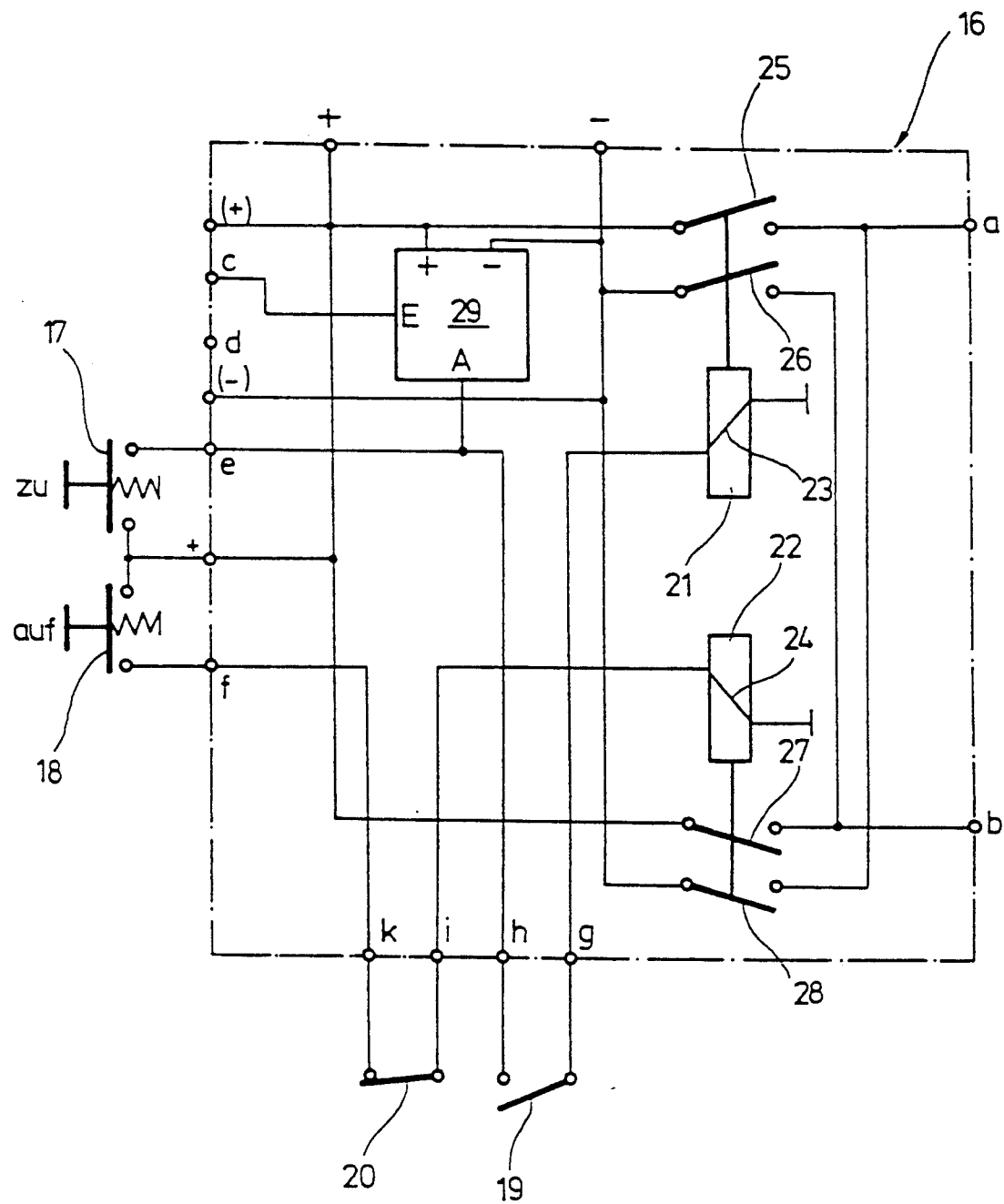
FIG. 2 shows a wiring diagram of a control device in the drive device in FIG. 1.

An embodiment example of the control device 16 is shown in FIG. 2 as a wiring diagram. In order to switch on the motor 10 in one rotating direction or the other two switch-on relays 21, 22 are provided whose relay windings 23, 24 are connected with the positive pole "+" of the d.c. voltage source 35 via the assigned end switch 19, 20 and the assigned selection switch 17, 18. Every switch-on relay 21, 22 has a double switching contact comprising switching contacts 25 and 26 or 27 and 28. In the closed state the switching contacts 25 and 27 connect the outputs a and b of the control device 16 with the positive pole "+" of the d.c. voltage source 35 and the switching contacts 26 and 28 connect the outputs b and a with the negative pole "−" of the d.c. voltage source 35.

For example, if the selection switch 18 actuates "window up" the switch-on relay 22 will be connected to the positive pole "+" of the d.c. voltage source 35 via the closed end switch 20 for the duration of the actuation of the selection switch 18. The two switching contacts 27, 28 close and accordingly connect the motor 10 to the d.c. voltage source 35 via the outputs b, a of the control device 16. The rotor shaft 11 rotates in one rotating direction and the window lifter is driven in the "window open" direction. If the window lifter has reached its end position in which the window is completely opened, the end switch 20 is opened and the excitement of the switch-on relay 22 is accordingly switched off. If the selection switch 17 actuates "window closed", the switch-on relay 21 is excited and driven via the closed switching contacts 25, 26 of the motor 10 in the opposite rotational direction. The window is closed again until the end switch 19 is opened in the end position.

Since the motor 10 as well as the window lifter are constructed so as to be extensively free of friction it is possible that the window will be opened unintentionally in the window closing position due to external influences, e.g. strong shaking. To prevent this a rotating movement of the rotor shaft 11 resulting during unwanted window movement is detected by the sensor 12 and a switching on of the motor 10 in a rotating direction causing the closing of the window is triggered when a determined number of revolutions of the rotor shaft 11 has been determined. For this purpose the sensor 12 is connected by one of its output channels 1, 2, in this case output channel 1, with the input E of an evaluating unit 29 whose output A is applied to the relay winding 23 of the switch-on relay 21 via the end switch 19. If the evaluating unit 29 detects a predetermined number of revolutions of the rotor shaft 11, it produces a switch-on signal which reaches the relay winding 29 via the output A and causes the closing of the switching contacts 25, 26.

Figure 3:
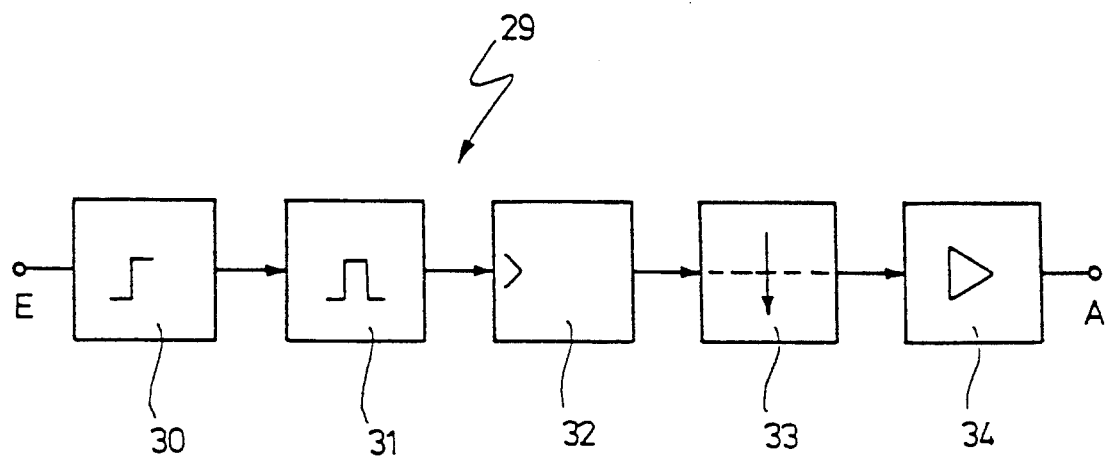
FIG. 3 shows a block wiring diagram of an evaluating unit in the control device according to FIG. 2.
Figure 4:
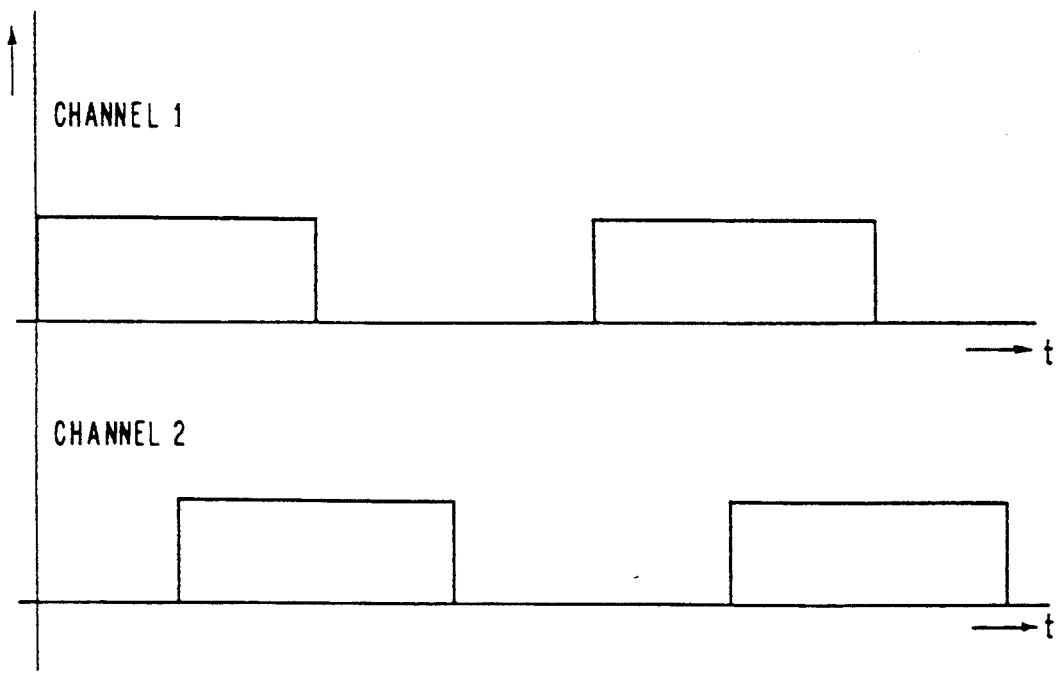
FIG. 4 shows a diagram of the output signals of a sensor for rotational movements of the rotor shaft in the drive device according to FIG. 1.

A possible embodiment example of the evaluating unit 29 is shown in the block wiring diagram in FIG. 3. It has a pulse edge detector 30, a pulse shaper 31, a counter 32 which can be preset, a monostable multivibrator 33, and an amplifier 34. The pulse edge detector 30 detects the rising positive edge of the output signals of the sensor 12 at the input E and sends an output signal to the pulse shaper 31 which generates a counting pulse from it. This counting pulse arrives at the counting input of the counter 32 which is constructed as a backwards counter and is preset to a predetermined counting step. The counter 32 counts one counting step backwards with every counting pulse. After the preset number of counting steps the counter 32 arrives at the zero level and gives a signal to the monostable multivibrator 33 which jumps to its unstable state for the duration of its resetting time and sends a signal to the output amplifier 34. The output amplifier 34 applies an exciter current to the relay winding of the switch-on relay 21 for the duration of the resetting time of the monostable multivibrator 33. The relay 21 attracts and the switching contacts 25, 26 close. The motor 10 is switched on and the rotor shaft 11 rotates in the "window closing" rotating direction.

The end switch 19, which previously closed automatically during the unwanted movement of the window out of the closing position, opens as soon as the closing position of the window is achieved again. The resetting time of the monostable multivibrator 33 is adjusted in such a way that it is greater than the time required for the window to close again after switching on the motor 10.

The invention is not limited to the embodiment example described above. Thus, the end switch 19, 20 can be dispensed with and, instead, the output signals of the sensor 12 can be made use of for switching off the motor 10 when the two end positions, "window closed" and "window open", are reached. The output signals of the sensor 12 further provide the possibility of moving automatically to predetermined window positions and of additionally providing a jamming protection which causes the motor to switch off when there is an obstacle in the movement path of the window.

Instead of the window lifter, other movable structural component units can also be driven and monitored in both movement end positions for unwanted movement out of the movement end positions. The control device 16 then evaluates the sensor signals on both output channels 1, 2 of the Hall IC and can accordingly additionally determine the rotating direction in which the motor 10 must be driven so that the desired movement state of the structural component unit is automatically produced again.

It will be understood that each of the elements described above, or two or more together, may also find a useful application in other types of constructions differing from the types described above.

While the invention has been illustrated and described as embodied in a drive device for movable structural component units, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drive device for movable structural component unit, particularly in vehicles such as window lifters, sliding-roof actuators, mirror adjusters and the like, the drive device comprising a reversible electric motor having a rotor shaft driveable in two rotating directions; a control device for switching on said motor in a predetermined rotating direction of said rotor shaft at switch-on command; and a sensor assigned to said rotor shaft of said motor for detecting rotational movements of said rotor shaft, said sensor being effective in a switched-off state of said motor, said control device containing an evaluating unit for evaluating signals of said sensor and for generating said switch-on command in a rotating direction opposite the rotational movement of said rotor shaft, said sensor providing an output signal for a predetermined rotary angle of said rotor shaft, said evaluating unit being formed so that it generates a counting pulse for every signal component, counts the counting pulses and generates the switch-on command at a predetermined number of the counting pulses, said sensor having a permanent magnet which is fixed with respect to rotation relative to said rotor shaft, and two stationary Hall sensors which are offset in the rotating direction of said rotor shaft and supply two pulse sequences composed of square pulses which are phase-shifted to two output channels.

2. A drive device as defined in claim 1, wherein said two stationary Hall sensors are integrated in a Hall IC which supplies said two pulse sequences.

3. A drive device as defined in claim 1, wherein said evaluating unit has an edge detector, a pulse shaper, a counter which can be preset and sends an output pulse when reaching a predetermined counter position so that the switch-on command is derived from the output pulse of said counter.

4. A derive device as defined in claim 1, wherein said two stationary Hall sensors are offset by 90° in the rotating direction of said rotor shaft and supply said two pulse sequences composed of said square pulses which are phase-shifted by 90°.

5. A drive device as defined in claim 1, wherein said sensor is formed so that it provides a counting pulse per revolution of said rotor shaft.

6. A drive device as defined in claim 1, wherein said sensor is fixedly mounted on said rotor shaft.

* * * * *